(No Model.) 2 Sheets—Sheet 1.
W. H. McCURDY.
SPEED INDICATOR FOR SHIPS.
No. 584,095. Patented June 8, 1897.
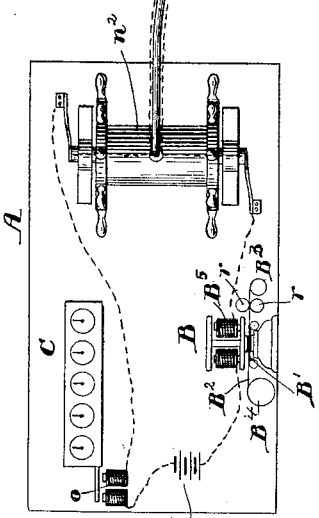
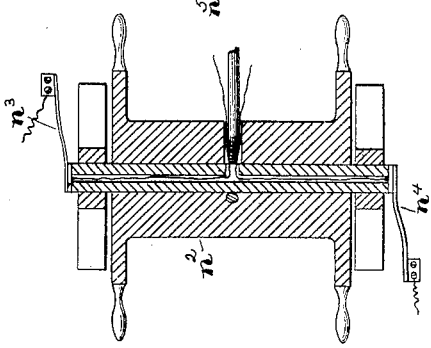
Witnesses:
Walter E. Lombard.
Thomas F. Drummond.
Inventor:
Warren H. McCurdy,
by Crosby Gregory,
Att'ys.

(No Model.) 2 Sheets—Sheet 2.
W. H. McCURDY.
SPEED INDICATOR FOR SHIPS.
No. 584,095. Patented June 8, 1897.
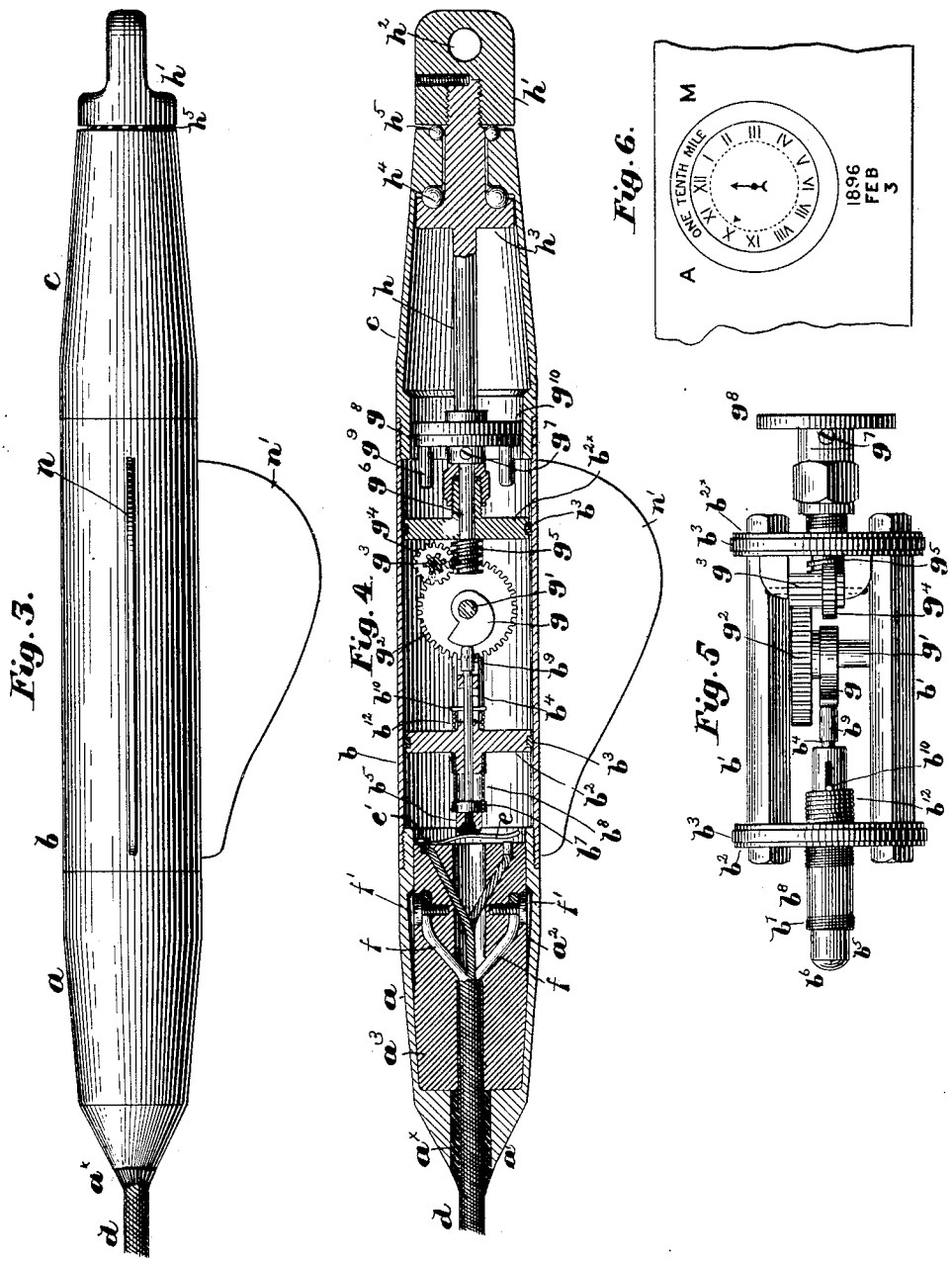
Witnesses:
Walter E. Lombard.
Thomas J. Drummond.
Inventor:
Warren H. McCurdy,
by Crosby Gregory.
Att'ys.

United States Patent Office.

WARREN H. McCURDY, OF BOSTON, MASSACHUSETTS.

SPEED-INDICATOR FOR SHIPS.

SPECIFICATION forming part of Letters Patent No. 584,095, dated June 8, 1897.

Application filed February 10, 1896. Serial No. 578,641. (No model.)

*To all whom it may concern:*

Be it known that I, WARREN H. McCURDY, of Boston, county of Suffolk, State of Massachusetts, have invented an Improvement in Speed-Indicators for Ships, of which the following description, in connection with the accompanying drawings, is a specification, like letters on the drawings representing like parts.

This invention has for its object to provide a ship's log of novel construction capable of closing an electrical circuit after the ship has traveled a predetermined distance, the said electrical impulse actuating a recording mechanism to make a distance-record on a suitable tape and stamp the time, the difference of time indicated between one and the next time-stamp record indicating the time required to travel a certain distance. The electrical impulse will also actuate a visual recording mechanism, which will indicate the number of miles traveled by the ship.

Figure 1 is a diagram representing a strip with recording time-stamp and visual recorder and a ship's log embodying my invention. Fig. 2 is a detail of the reel for the electric cable extended to the log. Fig. 3 is a top view of my improved log; Fig. 4, a longitudinal section thereof; Fig. 5, an enlarged detail of the devices for moving the rod which effects the electric closure. Fig. 6 shows a piece of a strip or ribbon of paper stamped in accordance with my invention.

The ship's log is herein shown as composed of three hollow parts $a$ $b$ $c$, firmly connected together, one part being screwed into another. The part $a$ has at one end a hole $a'$ for the cable $d$, and a chamber $a^2$, the chamber receiving a hollow plug of wood or other insulating material $a^3$ for the reception of the cable, the ends of the electrical wires of the cable being exposed at one end of the plug to be acted upon at suitable times by a push-button or closure $e$, made in the form of a spring-plate connected to the plug by a suitable screw $e'$, the wires $f$, which are used to give strength to the cable, being secured to the plug by suitable screws $f'$ or in other usual manner. The hole $a'$ about the cable is sealed water-tight by suitable packing $a^\times$. The part $b$ contains a frame $b'$, having heads $b^2$ $b^{2\times}$, grooved externally to receive packing $b^3$ to make a water-tight joint between the heads and the interior of the part $b$. The head $b^2$ is bored for the reception of a rod $b^4$, having screwed upon one end of it a collar $b^5$, provided at its end with some insulating material, as $b^6$, and the rod has also fixed to it a second collar $b^7$, (shown in Fig. 4,) about which is placed one end of a piece of rubber tubing $b^8$, the opposite end of the tubing being passed over a projection from one side of the head $b^2$ and thereon suitably attached. This tubing prevents the passage of water into the space between the two heads $b^2$ and $b^{2\times}$.

The rod $b^4$ is extended through a suitable guide and is provided with a knob $b^9$, which in practice will be screwed onto the rod, so as to be adjusted as desired or required. The rod has a cross-pin $b^{10}$, which is acted upon by a suitable spring $b^{12}$, the latter acting to keep the knob pressed against a cam $g$, having an abrupt shoulder (see Figs. 3, 4, and 5) and fast on a shaft $g'$, mounted in the frame $b'$ and provided with a gear $g^2$, which is engaged by a pinion $g^3$, fixed to a worm-gear $g^4$, engaged and rotated by a worm $g^5$, fast on a shaft $g^6$, supported in the said head $b^{2\times}$, the said shaft being extended outwardly beyond said head through a stuffing-box and having fixed to it by a suitable set-screw $g^7$ a plate $g^8$, suitably slotted to receive pins or projections $g^9$ of a crank or disk $g^{10}$, fixed on the end of a shaft $h$, a part of which is extended out through the part $c$ and threaded for the reception of an eyepiece $h'$, having a suitable hole $h^2$. The shaft $h$ has a fixed collar $h^3$, and between it and a shoulder of the part $c$, and also between the end of the part $c$ and the said eyepiece, I have placed antifriction-rolls $h^4$, to thus insure the turning of the shaft $h$ in its part $c$ with the minimum of friction. The eyepiece will have joined to it a rope or other flexible connection $m$ several feet in length and having attached to it a rotator $m'$, which may be such as commonly employed with ship's logs. The part $b$ will in practice have at diametrically opposite points balancing-vanes $n$ and at its under side a steadying-vane $n'$.

The electric cable $d$, which may be made in any usual manner, is represented in Fig. 1 as led into the barrel $n^2$ of a suitable reel and into a metallic journal thereof, and one wire out through each end of said journal, (see Fig. 2,) where said end is acted upon by a suitable spring, as $n^3$ $n^4$, said spring being in an electric circuit provided with a suitable local battery $n^5$ on the ship. When the log, so described, is placed overboard in the water, the rotator as it is drawn in the water will turn and rotate the shaft $h$, causing it to rotate the worm-shaft $g^6$ and turn by the gearing described the cam $g$, and the latter, which may be rotated at any desired speed by the employment of any suitable gearing, will act on the rod $b^4$ and will slide it, so that the insulated piece $b^6$ at the outer end of the rod will push the closure or push-button down onto the ends of the wires and complete the circuit in which they are connected once during each rotation of the cam. This cam may be rotated once for every one-tenth of a mile or any other desired distance, and at each time that the circuit is completed an electrical impulse is sent through the circuit to do work.

In Fig. 1, A is supposed to represent a ship, and at any suitable or desired part of the ship, preferably in the chart-room, I place a suitable recording time-stamp B, having an inking-ribbon B′, and coöperating with this ribbon is a strip or ribbon of paper $B^2$, which may be unwound from any suitable reel $B^3$ and wound again onto any suitable receiving-wheel $B^4$. The strip or ribbon may be passed between two rolls $r$ $r$, which will act to feed the strip, the feed-rolls being actuated intermittingly immediately after closing the circuit in the ship's log, a suitable spring or weight acting through a train of gearing (not shown) to rotate the feeding-rolls, as commonly practiced in connection with automatic registers used in electric circuits.

The stamp is in the electric circuit, and it is operated every time its magnet $B^5$ is energized in usual manner, and it may be arranged to stamp on the under side or the upper side of the strip or ribbon. The circuit also contains a registering mechanism C, consisting of a train of gearing and dials over which hands travel, one of said dials, the one at the left in Fig. 1, representing units, and the following ones tens, hundreds, thousands, and tens of thousands, so that by moving the gearing at the first dial by or through a suitable magnet $o$ the said dials may be moved step by step, and from them may be readily seen the number of miles that the ship has traveled on its voyage. This registering mechanism will preferably be mounted in the main saloon, where it may be viewed by the passengers.

Fig. 6 shows the stamp, which is made on the ribbon of paper. The stamp shows the imprint of the dial of a clock with an hour and minute hand, the position of the imprint of the hands being constantly changing as the hand indicating portions of the clock-train are revolved by the clock mechanism contained in the time-stamp, said mechanism being well known. The stamp also indicates the year, month, and day of the month, and it also shows either the two letters "A. M." or "P. M.," dividing the twenty-four-hour day at twelve o'clock. The stamp also may mark the record one-tenth of a mile, and by counting off ten stamps and taking the difference of their time the time consumed in traveling any one mile of the journey may be accurately ascertained. The reel may be rotated to give off or take up the cable, as required, and yet the cable will always be in circuit.

While I prefer to cast the ship's log into the water, yet my invention would not be departed from if the log should be fixed on shipboard and be actuated by the rotator, the rope $m$ being made long enough to adapt it to this condition.

I have shown the rod $b^4$ as acting directly by the collar at its end on the push-button, yet my invention is not in all cases to be limited to the exact means shown between the cam and push-button, as the closure of the push-button might be effected from the cam at stated intervals by other equivalent devices.

Having described my invention, what I claim as new, and desire to secure by Letters Patent, is—

1. A ship's log, having a chamber for the reception of an insulating-plug, and open at its end for the reception of an electric cable, combined with the said cable provided with strength-giving wires and electric wires wrapped together within an insulating-protector, and having its strength-giving wires fixed to the log, and the electric wires inside the log being separated from the strength-giving wires, and arranged to coöperate with a push-button, substantially as described.

2. The combination with an electric cable, of a ship's log composed of a hollow divided shell, containing an independent frame having opposite heads packed water-tight and inserted in said shell, and containing a cam and means to move it to actuate a push-button to effect the closing of an electric circuit, substantially as described.

3. In a ship's log, a head having a projection, and a slide-rod having a collar, combined with a piece of tubing surrounding said rod, and connected to said head and collar to form a water-tight joint, substantially as described.

4. A ship's log composed of a hollow divided shell having at one end a rotating driving-shaft, and having within said shell a train of mechanism mounted in and carried by an independent frame having opposite heads packed water-tight in said shell, and a shaft extended outwardly from one of said heads to be engaged and driven by the driving-shaft, combined with a stuffing-box through which the shaft driven by the driving-shaft is extended, to operate, substantially as described.

5. A ship's log, and a rotator therefor, a driving-shaft mounted in the former and connected to and to be rotated by the latter, and a driven shaft within the log, said two shafts being connected together end to end by disks carried by each, and suitable fastening means, as pins, symmetrically arranged to join the disks, substantially as described.

6. In combination with a ship's log, an electric cable containing electric wires, and strength-giving wires, nested together in a compact bunch and bound together by a protecting-covering, the latter wires being firmly secured to the log, substantially as described.

In testimony whereof I have signed my name to this specification in the presence of two subscribing witnesses.

WARREN H. McCURDY.

Witnesses:
GEO. W. GREGORY,
MARGARET A. DUNN.